United States Patent
Moncomble et al.

(10) Patent No.: US 9,614,966 B2
(45) Date of Patent: Apr. 4, 2017

(54) METHOD OF SAFEGUARDING ANONYMITY DURING A TELEPHONE COMMUNICATION AND TELECOMMUNICATION SYSTEM FOR IMPLEMENTING THE METHOD

(71) Applicant: Orange, Paris (FR)

(72) Inventors: Ghislain Moncomble, Lannion (FR); Fabrice Petesch, Rospez (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/403,400

(22) PCT Filed: May 17, 2013

(86) PCT No.: PCT/FR2013/051087
§ 371 (c)(1),
(2) Date: Nov. 24, 2014

(87) PCT Pub. No.: WO2013/175108
PCT Pub. Date: Nov. 28, 2013

(65) Prior Publication Data
US 2015/0117620 A1    Apr. 30, 2015

(30) Foreign Application Priority Data
May 24, 2012    (FR) ..................... 12 54800

(51) Int. Cl.
*H04M 1/64*    (2006.01)
*H04M 3/533*    (2006.01)
(Continued)

(52) U.S. Cl.
CPC .... *H04M 3/53383* (2013.01); *H04L 63/0407* (2013.01); *H04M 3/38* (2013.01);
(Continued)

(58) Field of Classification Search
CPC .................................................. H04M 3/42008
(Continued)

(56) References Cited

U.S. PATENT DOCUMENTS

| | | | |
|---|---|---|---|
| 6,970,906 B1 | 11/2005 | Parsons et al. | |
| 7,991,126 B1 * | 8/2011 | Wageman ......... | H04M 3/53325 379/88.18 |

(Continued)

FOREIGN PATENT DOCUMENTS

| | | |
|---|---|---|
| FR | 2824981 A1 | 11/2002 |
| WO | 2010076771 A1 | 7/2010 |

OTHER PUBLICATIONS

International Search Report dated Jul. 16, 2013 for corresponding International Application No. PCT/FR2013/051087, filed May 17, 2013.

(Continued)

*Primary Examiner* — Solomon Bezuayehu
(74) *Attorney, Agent, or Firm* — David D. Brush; Westman Champlin & Koehler, P.A.

(57) ABSTRACT

A method is provided for safeguarding anonymity during a communication with a correspondent, between a caller and a user being called. The communication has an anonymous nature. The method includes the following steps: upon receiving a response from the correspondent to the communication sent by the caller, putting the caller on hold; analysis of the response received from the correspondent, for determining whether the correspondent corresponds to the voicemail of the user being called; and in the case of a positive determination, playing to the caller an anonymous welcome message in which the identity of the user being called is masked.

13 Claims, 3 Drawing Sheets

(51) Int. Cl.
    H04L 29/06    (2006.01)
    H04M 3/42    (2006.01)
    H04W 12/02   (2009.01)
    H04M 3/38    (2006.01)
(52) U.S. Cl.
    CPC ... *H04M 3/42008* (2013.01); *H04M 3/53391* (2013.01); *H04W 12/02* (2013.01)
(58) Field of Classification Search
    USPC ................................. 379/88.01–88.19, 68
    See application file for complete search history.

(56) References Cited

U.S. PATENT DOCUMENTS

| | | | | |
|---|---|---|---|---|
| 2004/0107283 | A1* | 6/2004 | Paddon | G06Q 30/06 709/229 |
| 2005/0089149 | A1* | 4/2005 | Elias | H04M 3/53308 379/88.13 |
| 2008/0025488 | A1* | 1/2008 | Dean | H04M 3/42008 379/201.11 |
| 2008/0200151 | A1* | 8/2008 | Lohr | H04M 1/57 455/413 |
| 2009/0061828 | A1* | 3/2009 | Sigmund et al. | 455/413 |
| 2009/0061832 | A1* | 3/2009 | Goggans | H04M 19/04 455/414.1 |
| 2009/0083115 | A1* | 3/2009 | Pearson | G06Q 10/06 705/7.13 |
| 2009/0225962 | A1* | 9/2009 | Corry | H04M 3/436 379/88.18 |
| 2010/0020944 | A1 | 1/2010 | Ray | |
| 2010/0158214 | A1* | 6/2010 | Gravino | H04M 3/53333 379/88.14 |
| 2013/0282850 | A1* | 10/2013 | Lu et al. | 709/206 |

OTHER PUBLICATIONS

English translation of the International Preliminary Report on Patentability dated Feb. 10, 2015 for corresponding International Application No. PCT/FR2013/051087, filed May 17, 2013.

* cited by examiner

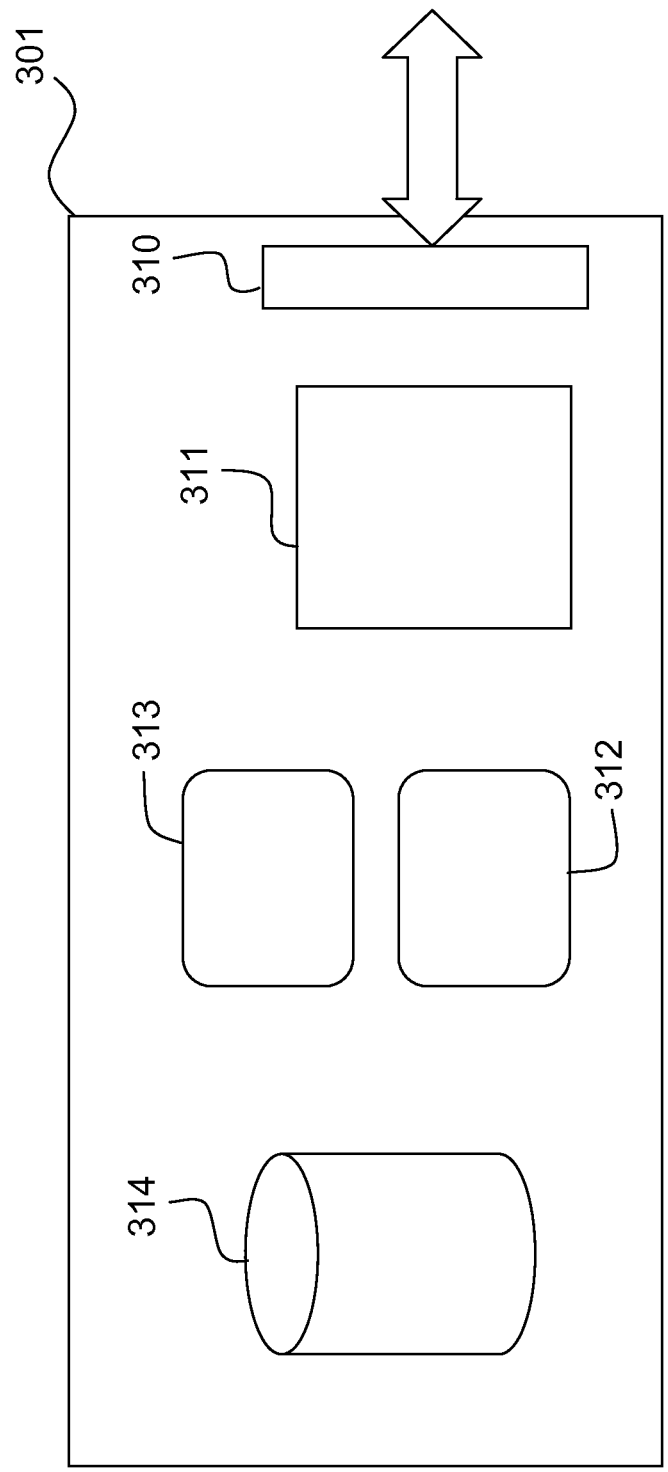

METHOD OF SAFEGUARDING ANONYMITY DURING A TELEPHONE COMMUNICATION AND TELECOMMUNICATION SYSTEM FOR IMPLEMENTING THE METHOD

CROSS-REFERENCE TO RELATED APPLICATION

This application is a Section 371 National Stage Application of International Application No. PCT/FR2013/051087, filed May 17, 2014 and published as WO 2013/175108 A1 on Nov. 28, 2013, not in English, the content of which is hereby incorporated by reference in its entirety.

FIELD OF THE DISCLOSURE

The invention relates to the field of telephone communications and of services provided to the users of a telecommunications network.

One subject of the invention is a method allowing anonymity to be safeguarded during a telephone communication between a caller and a correspondent, together with a telecommunications system for implementing this method.

More precisely, the aim of the invention is to guarantee the conservation of the anonymity of the correspondent at every stage of the telephone communication, in particular when the correspondent is absent and when his/her personal voicemail is activated.

BACKGROUND OF THE DISCLOSURE

Various known methods allow a telephone call to be made to a correspondent who wishes to conserve, completely or partially, his/her anonymity. In such a scenario, the telephone number and/or the real identity of the correspondent are not disclosed to the caller who only knows an alias associated with this correspondent.

These methods, such as that described in the international patent application of the applicant published under the number WO 2010/076771, are based on a connection between the two users via a trustworthy third party. This third party, who may for example be the telephone operator, possesses the number of the correspondent and has the role of routing the communication without disclosing to the caller the information relating to the identity of this correspondent.

However, the known methods allowing the anonymity of the correspondent to be preserved are all based on the assumption that the communication is successful in all cases, in other words the correspondent is present and answers the call. It is never envisioned that the correspondent might not be available, may be absent or not accessible.

However, if the correspondent does not answer the call, at the end of a settable time, his/her voicemail is generally activated and a personal welcome message is played which discloses either the identity or the telephone number of the correspondent. There is therefore no conservation of anonymity in such a case. The document US 2008/0025488A1 describes a system for anonymous communications allowing an anonymous communication between a caller and a user being called.

One possible solution to this problem consists in allowing the telephone operator to detect the anonymous nature of the call and to allow a welcome message, different from the standard message, to be played which would disclose neither the identity nor the telephone number of the correspondent.

However, such a solution limits the service offered to the subscribers of the telephone operator in question alone, which offers a very limited advantage. Therefore, there exists a need to guarantee the conservation of the anonymity of the correspondent even when his/her voicemail is activated and that is independent of the respective operators of the caller and of the correspondent.

SUMMARY

The present invention aims to improve the situation.

One subject of the invention is thus a method for safeguarding anonymity during a communication with a correspondent, between a caller and a user being called, the communication being of an anonymous nature, the method being characterized in that it comprises the following steps:

upon receiving a response from the correspondent to the communication sent by the caller, putting the caller on hold, analysis of the response received from the correspondent, for determining whether the correspondent corresponds to the voicemail of the user being called, in the case of a positive determination, playing an anonymous welcome message to the caller in which the identity of the user being called is masked.

The invention provides a solution which does not require any modification of the infrastructures of the telecommunications systems and which is independent of the type of telephone communication, landline or mobile.

The invention is applicable in all the scenarios where the anonymity of the receiver of a call is desired, for example within the framework of calls between two users of a social network who are only identified by an alias.

The invention also allows a solution to be offered that is independent of a telephone operator.

In one variant embodiment, the method according to the invention furthermore comprises the following steps:

saving a message left by the caller in response to the anonymous welcome message, transmission of an indication of the presence of a message left by the caller to the user being called.

Thus, the caller has the possibility of leaving a message for the user being called in order to inform him/her of the reason for the call, for example a personal call or a business call. The user being called who has not been able to take the anonymous communication is informed of the call by the indication of the presence of a message.

According to one particular aspect of the invention, when the correspondent has been determined as corresponding to the voicemail of the user being called, the communication link between the caller and the correspondent is interrupted.

Thus, the communication resources of the voicemail server are optimized. The caller can then be in communication with another server in order to listen to an anonymous welcome message or to be able to leave a message for the user being called, when these functionalities are not implemented by the voicemail server. This embodiment is advantageous in the case where the method according to the invention is implemented by a service provider independent of the telephone operator of the user being called and/or of the caller.

According to another particular aspect of the invention, putting the caller on hold is implemented by the sending to the caller of a succession of specific sounds or of a specific holding message.

The caller is then aware of the holding status and is not likely to hang up before having listened to the anonymous welcome message and/or left a message for the person being called.

According to another particular aspect of the invention, the correspondence between the correspondent and the voicemail of the user being called is determined by at least one of the following steps or by several of the following steps implemented successively or simultaneously:
  identification of a DTMF code specific to the activation of a voicemail,
  comparison of at least one part of the response received from the correspondent with at least one part of a default welcome message of the voicemail from a telecommunications operator,
  transmission of an interactive message to the correspondent and comparison of the response to the interactive message received with an expected response.

Advantageously, the use of several methods allows the determination of the correspondence between the correspondent and the voicemail of the user being called to be accelerated, thus reducing the waiting time of the caller.

According to another particular aspect of the invention, the anonymous welcome message is hosted on a server distinct from the voicemail server of the user being called. The service for safeguarding the anonymity during an anonymous communication can thus be implemented independently of the telephone operator of the person being called. It can be implemented by any given service provider allowing an anonymous communication with a correspondent to be established.

According to another particular aspect of the invention, the indication of the presence of a message left by the caller is communicated to the user being called via a text message comprising a link allowing the message left by the caller to be accessed.

Advantageously, the person being called may, if he/she wishes, consult the left message. By this embodiment, when the left message is saved on a server distinct from the voicemail server of the person being called, the message left does not use any resources of the voicemail server. For example, if a message is of an advertising nature, the user being called remains free from consulting this message.

According to another particular aspect of the invention, the message left by the caller is transmitted to the voicemail server of the user being called by means of a call simulation mechanism.

Advantageously, the user being called thus has access to all his/her voice messages based on one single access to his/her voicemail. The user can then benefit from all the possible functionalities on this message left with his/her voicemail, for example a simplified display of the message when his/her telephone operator offers him/her a service for displaying his/her voice messages.

According to another particular aspect of the invention, information indicating that the communication is anonymous is inserted into the message left by the caller before transmission to the user being called.

Advantageously, if the user being called wishes to call back the caller subsequent to the message being left, he/she is informed that his/her anonymity has been conserved during the first communication and can take suitable precautions for conserving it again during the call back.

Another subject of the invention is a device for safeguarding the anonymity during a communication with a correspondent, between a caller and a user being called, the communication having an anonymous nature, the device being characterized in that it comprises:
  means for receiving a response from the correspondent to the communication sent by the caller,
  means for putting the caller on hold,
  means for analyzing the response received from the correspondent, in order to determine whether the correspondent corresponds to the voicemail of the user being called,
  means for playing an anonymous welcome message to the caller in which the identity of the user being called is masked.

In one variant embodiment, the device according to the invention furthermore comprises means for saving a message left by the caller in response to the anonymous welcome message and means of transmission of an indication of the presence of a message left by the caller to the user being called.

Yet another subject of the invention is a server comprising a device according to the invention and a terminal comprising a device according to the invention.

A further subject of the invention is a computer program comprising instructions for the execution of the method for safeguarding anonymity according to the invention, when the program is executed by a processor.

Yet another subject of the invention is a recording medium readable by a processor on which a program comprising instructions for the execution of the method for safeguarding anonymity according to the invention is recorded, when the program is executed by a processor.

BRIEF DESCRIPTION OF THE DRAWINGS

Others features and advantages of the present invention will become more clearly apparent upon reading the description that follows with reference to the appended drawings, in which:

FIG. 3 shows a schematic block diagram of a device for safeguarding the anonymity comprising means adapted to the implementation of the method according to the invention.

DETAILED DESCRIPTION OF ILLUSTRATIVE EMBODIMENTS

In the following part of the description, the terms "anonymous communication" and "anonymity" are used with reference to a communication between a caller and a user being called for which the telephone number and/or the identity of the user being called are not disclosed. The term "correspondent" is used both to designate the user being called or the voicemail of the user being called. The terms "correspondent" or "user being called" are used interchangeably for designating the physical person receiving the call.

The method according to the invention described hereinafter is aimed at conserving the anonymity of a telephone communication during all the steps of its implementation including when functions relating to the voicemail are involved.

Figure 1:
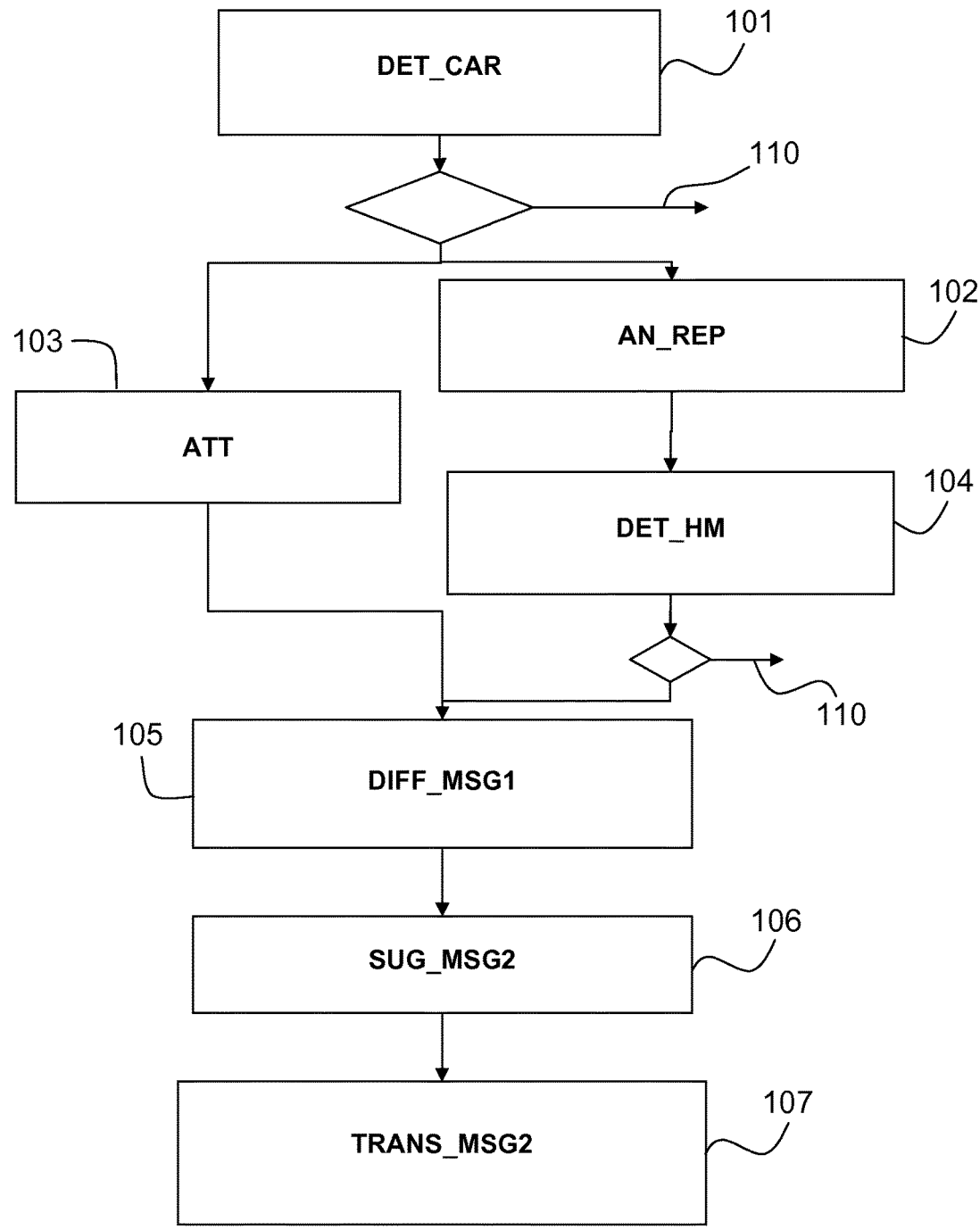
FIG. 1 shows a flow diagram summarizing the main steps of the method according to the invention for safeguarding the anonymity between a caller and a correspondent.

FIG. 1 summarizes, on a flow diagram, the sequencing of the main steps of the method according to the invention.

In a first step 101, the anonymous nature of the communication between the caller and the user being called is determined and conserved. If the communication is not detected as being anonymous, in other words the identity of the user being called is not to be kept secret with regard to the caller, then the method is terminated and a conventional communication 110 is established between the caller and the user being called.

If, on the other hand, the anonymous nature of the call is detected, a second step 102 is executed consisting in listening to and in analyzing the response of the correspondent in order to detect the "pick-up" event, in other words in order to detect the reception of the call.

In a third step 103, the caller is temporarily put on hold while masking the response of the correspondent to the caller, for example playing an audio sequence or a specific message to the caller in order to make him/her wait.

In a fourth step 104, the "human" or "machine" nature of the correspondent is determined. In other words, it is attempted to detect whether the user being called is present and really has picked up in response to the call received or whether, on the contrary, he/she is not available and his/her voicemail has been activated. If the user being called is present and answers the call, the method is terminated and a conventional communication 110 is established between the caller and the person being called.

If, on the other hand, the activation of a voicemail is detected, then the third step 103 and fourth step 104 are terminated and a fifth step 105 allows a specific welcome message to be played to the caller in which the identity of the correspondent is rendered anonymous.

According to one particular embodiment of the invention, during the step 105, the communication link between the caller and the correspondent is cut.

According to another particular embodiment of the invention, subsequent to listening to the welcome message rendered anonymous, the caller has the possibility of recording a voice message for the person being called.

In a sixth optional step 106, if a voice message is left by the caller following the playing of the anonymous welcome message, the latter is saved.

Finally, in a last step 107, which is also optional, the voice message left by the caller is communicated to the user being called while potentially inserting an introductory note to make the correspondent aware of the fact that his/her identity has not been divulged.

Figure 2:
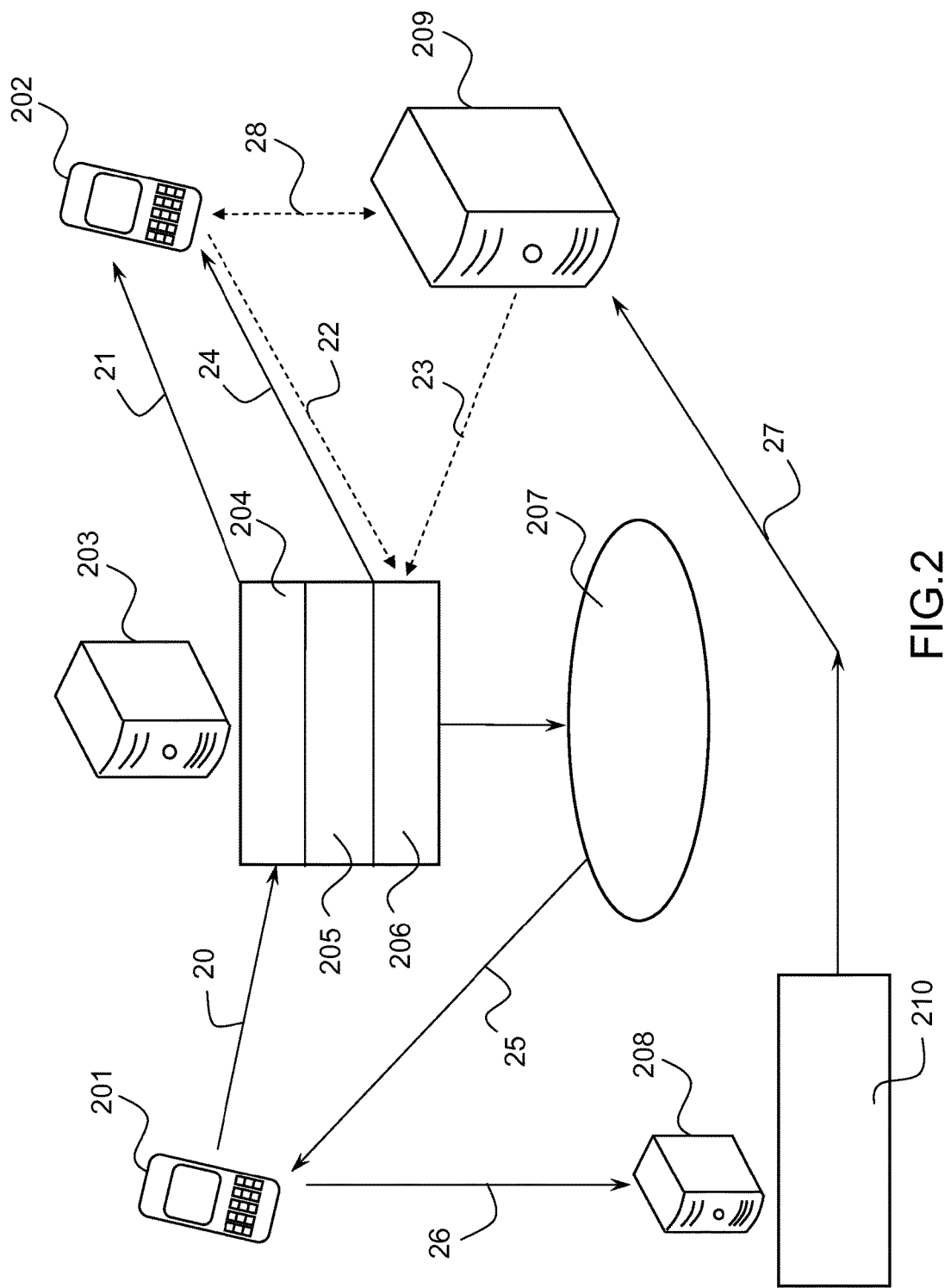
FIG. 2 shows a diagram illustrating the implementation of the method according to the invention.

Each step of the method according to the invention will now be described in more detail with the support of FIG. 2 which illustrates, on a diagram, one exemplary implementation of the invention for carrying out an anonymous communication between a caller and a user being called.

A telephone communication is initiated 20 by the terminal 201 of the caller. In a first step 101 of the method according to the invention, the anonymous nature of this communication is detected. This information is known by default when the call is established, because this establishment follows a specific procedure. In order to reach a correspondent without knowing his/her telephone number, a mediation server 203 is used to intercept the communication and associate the identifier or the alias of the person to be contacted with his/her telephone number in order to subsequently route 21 the call to the destination terminal 202 sought.

In other words, in his/her address book which can be displayed on his/her terminal 201, for example a mobile telephone, the caller does not have the telephone number or even the real identity of the correspondent. Only an alias appears in the address book of the caller. When the caller wants to communicate with a correspondent identified by an alias in his/her address book, the call is routed 20 toward a mediation server 203 which implements a mediation service provided by the telecommunications operator and which allows the alias in the address book to be associated with the telephone number of the correspondent. This association is, for example, made by interrogating a database specific to this mediation service. The call is subsequently routed 21 from the mediation server 203 toward the destination terminal 202, for example the mobile telephone, of the correspondent.

Thus, the "anonymous" nature of the communication is detected by the mediation server 203 whenever it receives a call intended for a correspondent identified by an alias. This information is conserved all through the implementation of the method according to the invention and is associated with the communication.

In one variant embodiment of the first step 101 of the method according to the invention, the information relating to the telephone numbers of the correspondent identified by an alias is available in the address book of the caller but this information is masked so as not to be disclosed to the caller. The "anonymous" nature of the communication is associated with the call as soon as the alias of the correspondent in the address book is selected and is detected by the telecommunications operator when the communication is established. In this variant, the mediation server 203 is not needed.

According to one particular embodiment of the invention, the information relating to the anonymity of the communication is saved on a server belonging to the operator of the service and does not need to be communicated to the destination terminal 202.

According to another particular embodiment of the invention, the information relating to the anonymity of the communication is transmitted to the destination terminal 202 or to a domestic communications gateway (not shown) allowing the destination terminal 202 to access the telecommunications networks. Thus, in this particular embodiment, the terminal 202 or the gateway can implement the method for safeguarding anonymity according to the invention.

If the communication is not anonymous, the call continues according to a conventional procedure which is not a subject of the present invention.

In a second step 102 of the method according to the invention, a first listening and analysis means 204 is activated in order to determine the expected response 22, 23 of the correspondent following the establishment of the communication by the caller.

This first listening and analysis means 204 can be implemented on the mediation server 203, on a centralized server within the network of the operator or on a specific server dedicated to the implementation of the method according to the invention. It may also be implemented directly on the terminal 201 of the caller in the form of a software application.

The function of the first listening and analysis means 204 is the detection of the "pick-up" event from the correspondent of the call. In other words, the aim here is to detect the time from which the reception of the call takes place and the communication between the caller and the correspondent is established.

More often than not, the "pick-up" event is characterized by the automatic generation of a specific DTMF (Dual Tone Multi Frequency) code. A DTMF code corresponds to a combination of specific frequencies. The first listening and analysis means 204 consists, in this case, in listening to the response 22, 23 from the correspondent and in identifying the DTMF code generated following the pick-up. For this purpose, for example, a comparison of the response of the correspondent with a pre-recorded audio sequence can be implemented in order to detect the presence of the DTMF code in the response received and analyzed.

When the correspondent is not available and when his/her voicemail is activated subsequent to the "pick-up" event, his/her identity risks being disclosed to the caller if the welcome message of the voicemail of the user being called is played to the caller.

In order to avoid this loss of anonymity, in a third step 103 of the method according to the invention, a second means 205 is implemented for temporarily masking from the caller the response of the correspondent which is likely to consist, at the start, of his/her welcome message. In other words, the third step 103 of the method consists in putting the caller 201 on hold. This third step 103 can be triggered as soon as the communication is initiated, in parallel with the second step 102 or successively to the second step 102, once the "pick-up" event has been detected.

In a first variant of the third step 103 of the method according to the invention, the second means 205 consists in masking the "pick-up" event of the correspondent from the caller such that the caller has the impression that the terminal 202 of his/her correspondent is still ringing. For this purpose, as soon as the anonymous nature of the communication is established, the second means 205 plays an audio tape for the caller composed of specific sounds.

In a second variant of the third step 103 of the method according to the invention, the caller hears the code indicating that the communication with his/her correspondent is established, but the audio indicator continues on another tone, indicating to him/her that the correspondent is still not ready.

For this purpose, following the detection of the "pick-up" event, the second means 205 plays exclusively for the caller an audio tape corresponding to a new specific succession of sounds. The communication channel between the caller and the correspondent is then momentarily interrupted. The specific succession of sounds may also be replaced by a specific message of the type "do not hang up, we are identifying your correspondent" in order to make the caller, who is aware of the anonymous nature of the communication, wait.

In the same way as the first listening and analysis means 204, the second means 205 can be implemented on the mediation server 203, on a centralized server within the network of the operator, on a specific server dedicated to the implementation of the method according to the invention or else directly on the terminal 201 of the caller in the form of a software application.

In a fourth step 104 of the method according to the invention, the response of the caller is analyzed in order to determine whether it corresponds to a pick-up of the correspondent 22 or to an activation of his/her voicemail 23. This analysis step 104 is carried out simultaneously with the third step 103 for putting the caller on hold by masking the response of the correspondent from the caller and ends up with the definition of a "human" or "machine" state associated with the receiver of the call following the pick-up. It can be implemented by a third analysis means 206 or directly by the first listening and analysis means 204 depending on the variant embodiment selected.

Several solutions are possible for detecting the activation of a voicemail.

In a first variant embodiment of the fourth step 104 of the method according to the invention, certain implementations of voicemails incorporate a specific DTMF code or equivalent which is played systematically with the activation of the voicemail. This implementation depends on the telephone operator. In this case, the detection of the activation of the voicemail may be carried out by identifying the code associated with the voicemail. This step can be implemented by a specific third analysis means 206 or by the first listening and analysis means 204 which detects the DTMF code played in the response of the correspondent and identifies whether this code corresponds to a pick-up or to the activation of the voicemail. If the code sought is not heard within a given period of time, for example equal to one second, following the pick-up, the "human" state is associated with the correspondent; the method according to the invention is then interrupted and the link between the caller and the correspondent is automatically established.

However, depending on the telephone operator in question, the activation of the voicemail does not systematically lead to the generation of a specific DTMF code or equivalent.

In a second variant embodiment of the fourth step 104 of the method according to the invention, a recognition of the default welcome message of the correspondent is implemented. The telephone operators corresponding to each number of a potential correspondent are pre-determined, for example based on the allocation of the ranges of numbers per operator in a given country and the default welcome message of the voicemail of each operator is conserved in a storage space accessible to the first listening and analysis means 204. An analysis of the response of the correspondent is carried out over a given period of time, for example equal to a few seconds, in order to compare this response with each saved default welcome message. This audio comparison may be carried out using known techniques of the prior art. In the case of a similarity between the sample of response analyzed and one of the saved default welcome messages, the third analysis means 206 concludes the activation of a voicemail. In the opposite case, it concludes the "human" state of the correspondent.

In a third variant embodiment of the fourth step 104 of the method according to the invention, the "human" state of the correspondent is determined by introducing an interaction between the third analysis means 206 and the correspondent. This interaction is implemented in the following manner.

As soon as the "pick-up" event is detected, an automatic message requesting an interaction is played to the correspondent. For example, this message may be of the type "will you take this anonymous call? Answer by yes or by no". The response of the correspondent is subsequently analyzed, for example by voice recognition, in order to determine the response "yes" or "no" of the correspondent or the absence of a response.

If the response "yes" is detected, the method is automatically terminated and the communication between the caller and the correspondent is established.

If no response is detected after a given period of time, for example equal to four seconds, or if the response "no" is detected, the method continues.

Any other interactive message requiring the correspondent to provide a binary response "yes" or "no" may be envisioned. Instead of a vocal response, the expected response may also consist, for the correspondent, in composing a specific DTMF code which is associated with the "human" state of the correspondent.

The period of time for which the response of the correspondent is masked to the caller corresponds to the period of time for determining the human or machine nature of the correspondent. In other words, the third step 103 ends at the same time as the fourth step 104. It is important that this period is as short as possible for the method according to the invention to end before the activation of the recording of the message on the voicemail of the correspondent.

In order to minimize the period of time needed for detecting the activation of the voicemail, the three variant embodiments described hereinabove may be implemented simultaneously in order to optimize the time for execution of the method. In this case, the third analysis means 206 can implement the three variants in parallel and the first one of them that generates a result on the state of the correspondent takes priority over the others.

In particular, it may be envisioned for the generation of a specific DTMF code for activation of the voicemail to be systematic and for the detection of this code to allow the "machine" nature of the correspondent to be of determined in a fast and definite manner. In the case where such a code is not provided by the telephone operator, the two other variant embodiments may prove to be useful.

In order to further improve the efficacy of the method and to make a prior determination as to which of the three variant embodiments is the best adapted to the case in question, it is necessary to know in advance the type of implementation of voicemail of the telephone operator in the case of a communication between a caller and a correspondent who are subscribers to different operators. This information is stored in a database accessible to the anonymous communications service and connected with each telephone number of each potential correspondent. In this case, as soon as the call is established, it is possible to know whether the voicemail of the correspondent uses a specific DTMF code and which one.

If the "human" state of the correspondent is detected, the caller and the correspondent are connected 24 and the communication takes place in a conventional manner.

If the "machine" state is detected, meaning that the voicemail of the correspondent has been activated, then, in a fifth step 105 of the method according to the invention, the communication link between the caller and the correspondent is definitively cut and a specific welcome message 207 is played 25 to the caller inviting him/her to leave a voice message for the attention of his/her anonymous correspondent. The specific message 207 is designed to preserve the anonymity of the correspondent. It may consist of a default message, but the anonymous communications service may also have interfaces available allowing each person to create his/her own anonymous welcome message, and this person then has the responsibility to not disclose his/her identity. The server hosting the anonymous welcome message 207 may, depending on the implementations, be either the mediation server 203, or a specific stand-alone server 208 which also stores the voice message of the caller intended for the correspondent, if the caller decides to leave such a message.

After listening to the welcome message of the service for establishing an anonymous communication and according to a sixth step 106 of the method according to the invention, the caller may therefore decide to leave 26 a voice or text message for the attention of his/her correspondent. This message is recorded on a specific server 208, or on the mediation server 203, so as to be subsequently transmitted 27 to the correspondent in a last step 107 of the method according to the invention. If the message is a text message, it can be composed using the terminal of the caller or transcribed by the server receiving the voice message of the caller.

In a first variant embodiment of the last step 107 of the method according to the invention, the message recorded by the caller is communicated to the correspondent via an SMS text message which contains a hypertext link allowing the message to be heard and, where desired, to call back his/her correspondent anonymously. Instead of an SMS message, an e-mail may also be sent to the correspondent also containing a hypertext link allowing the message from the caller to be heard, and then it is up to the correspondent to subsequently call back the caller by the method of his/her choice.

In a second variant embodiment of the last step 107 of the method according to the invention, the voice message left by the caller is conserved within a complete voicemail system forming an integral part of the anonymous communications service. Thus, the anonymous voicemail system may be called in order to update the anonymous welcome message and in order to consult the messages left by the caller. The consultation of this voicemail is achieved by means of a specific number.

In a third variant embodiment of the last step 107 of the method according to the invention, the message recorded by the caller is copied 27 to the personal voicemail server 209 of the correspondent, without causing the telephone of the latter to ring. This copying is carried out by using a mechanism for depositing from inbox to inbox. Such a mechanism may be implemented for each telephone operator using the programming interfaces supplied in order to access the mechanism for directly updating the voicemail.

So as not to depend on the access to the programming interfaces of each telephone operator, another solution consists in implementing a call simulation mechanism which consists in simulating a call to the number of the service for directly updating the voicemail of the correspondent so as to subsequently copy the message saved on the specific server 208 to the voicemail of the correspondent.

Such a simulation mechanism consists in composing the telephone number of the service concerned of the targeted operator, then in composing the series of the various DTMF codes allowing access to the function for leaving a message, while complying with the expected sequences such as are indicated by the interactive voice server of the service of the operator, then in reading the voice message of the caller previously saved, and lastly in validating the latter.

The advantage of this variant of the invention consists, for the correspondent, in disposing of all his/her messages on a single voicemail accessible using a unique voicemail number and hence without any specific operation to be performed for the user. The correspondent 102 can then subsequently consult 28 the message left by the caller 201 on his/her personal voicemail 209.

In the case where, after having read the message from the caller, the correspondent wishes to directly call him/her back, without using an anonymous communications service, then his/her anonymity will no longer be preserved because his/her telephone number can be displayed on the terminal receiving the call.

In order to avoid this problem and to further reinforce the preservation of the anonymity, during the transmission of the voice message of the caller from inbox to inbox, the telephone number of the caller is masked or replaced by a generic identifier of the type "anonymous call". Such a functionality is facilitated by the using an inbox-to-inbox transfer mechanism because the call originates physically from the server 208, 203 in which the voice message is pre-recorded, and an identification of the type "anonymous message" can be assigned to said server 208, 203. On the other hand, a generic phrase using voice synthesis may also be added to the voice message of the caller, for example at the start of the message, indicating to the correspondent that the message is anonymous and that, in order to reply to the caller without disclosing his/her identity, the application associated with the anonymous communications service should be used, in other words the application which implements the method according to the invention. This preprocessing 210 of the voice message recorded by the caller can be directly carried out by the autonomous server 208, 203.

In this way, the method according to the invention allows the conservation of the anonymity of a communication to be guaranteed from end to end.

As explained hereinabove, the invention can be implemented by means integrated into one and the same server 203 or into several separate servers 203, 208 or else into the terminal of the caller 201 and into a safeguard server 208, or into a domestic gateway connected to the terminal of the user being called 202.

The method according to the invention may be implemented using hardware and/or software elements. It may notably be implemented as a computer program comprising instructions for its execution. The computer program can be recorded on a recording medium readable by a processor.

FIG. 3 shows a schematic overview diagram of a device 301, according to the invention, for safeguarding anonymity during a communication with a correspondent.

Such a device 301 comprises at least communication means 310, for example a network interface, a processor 311 for executing the instructions of the computer program in order to implement the method according to the invention, a memory 312 for storing the instructions of the program, a volatile memory 313 for the execution of the program and a means 314 for storing an anonymous message, for example a storage memory.

The device 301 according to the invention is advantageously hosted in a mediation server 203 specific to the invention.

Although the present disclosure has been described with reference to one or more examples, workers skilled in the art will recognize that changes may be made in form and detail without departing from the scope of the disclosure and/or the appended claims.

The invention claimed is:

1. A computer-implemented method for safeguarding anonymity of a user being called during a communication between a terminal of a caller and a correspondent device of the user being called, the correspondent device being a terminal of the user being called or a voicemail server associated with the user being called, the method comprising executing on a processor the following acts:
   storing in a database an association between a telephone number of the correspondent device and an alias of the correspondent device, which is different than the telephone number of the correspondent device;
   detecting that the communication is directed from the terminal of the caller to the alias of the correspondent device that is stored in the database;
   in response to detecting the communication being directed to the alias, routing the communication to the telephone number of the correspondent device associated with the alias;
   receiving an audio sequence from the correspondent device in response to the communication sent by the terminal of the caller;
   putting the terminal of the caller on hold before or after receiving the audio sequence, to prevent the terminal of the caller from receiving a welcome message from the voicemail server,
   analyzing the audio sequence received from the correspondent device, in order to determine whether the audio corresponds to a pick-up of the terminal of the user being called, or a pick-up of the voicemail server associated with the user being called,
   in the case in which the processor determines that the audio sequence corresponds to the pick-up of the terminal of the user being called, taking the terminal of the caller off hold and establishing a communication link between the terminal of the caller and the terminal of the user being called; and
   in the case in which the processor determines that the audio sequence corresponds to the pick-up of the voicemail server associated with the user being called, interrupting the communication link between the terminal of the caller and the correspondent device, and initiating transmission to the terminal of the caller of an anonymous welcome message in which the identity of the user being called is not revealed, the anonymous welcome message being stored in a non-transitory computer-readable medium, which is not part of the voicemail server.

2. The method as claimed in claim 1 furthermore comprising the following acts:
   saving a message left by the caller in response to the anonymous welcome message,
   transmission of an indication of the presence of a message left by the caller to the terminal of the user being called.

3. The method as claimed in claim 1, in which the putting on hold of the terminal of the caller is implemented by sending to the terminal of the caller a succession of specific sounds or a specific on-hold message.

4. The method as claimed in claim 1 in which correspondence between the audio sequence received from the correspondent device and the voicemail response of the user being called is determined by at least one of the following acts:
   identifying a DTMF code specific to the activation of a voicemail message,
   comparing at least a part of the audio sequence received from the correspondent device with at least a part of a default welcome message of the voicemail server from a telecommunications operator,
   transmitting an interactive message to the correspondent device and comparing a response to the interactive message received with an expected response.

5. The method as claimed in claim 1 in which the anonymous welcome message is hosted on a server distinct from the voicemail server of the user being called.

6. The method as claimed in claim 2 in which the indication of the presence of a message left by the caller is communicated to the terminal of the user being called via a text message comprising a link allowing the message left by the caller to be accessed.

7. The method as claimed in claim 2 in which the message left by the caller is transmitted to the voicemail server of the user being called by using a call simulation mechanism.

8. The method as claimed in claim 2 in which information indicating that the communication is anonymous is inserted into the message left by the caller before transmission to the terminal of the user being called.

9. A device for safeguarding the anonymity of a user being called during a communication between a terminal of a caller and a correspondent device of the user being called, the correspondent device being a terminal of the user being called or a voicemail server associated with the user being called, the device comprising:

a memory storing computer-readable instructions; and a processor configured by the instructions to perform acts comprising:

storing in a database an association between a telephone number of the correspondent device and an alias of the correspondent device, which is different than the telephone number of the correspondent device;

detecting that the communication is directed from the terminal of the caller to the alias of the correspondent device that is stored in the database;

in response to detecting the communication being directed to the alias, routing the communication to the telephone number of the correspondent device associated with the alias;

receiving an audio sequence from the correspondent device in response to the communication sent by the terminal of the caller;

putting the terminal of the caller on hold before or after receiving the audio sequence, to prevent the terminal of the caller from receiving a welcome message from the voicemail server;

analyzing the audio sequence received from the correspondent device, in order to determine whether the audio sequence corresponds to a pick-up of the terminal of the user being called, or a pick-up of the voicemail server associated with the user being called;

in the case in which the processor determines that the audio sequence corresponds to the pick-up of the terminal of the user being called, taking the terminal of the caller off hold and establishing a communication link between the terminal of the caller and the terminal of the user being called; and in the case in which the processor determines that the audio sequence corresponds to the pick-up of the voicemail server associated with the user being called, interrupting the communication link between the terminal of the caller and the correspondent device, and initiating transmission of an anonymous welcome message to terminal of the caller in which the identity of the user being called is not revealed, the anonymous welcome message being stored in a non-transitory computer-readable medium, which is not part of the voicemail server.

10. The device as claimed in claim 9 wherein the processor is further configured to safeguard a message left by the caller in response to the anonymous welcome message and transmit an indication of a presence of the message left by the caller to the terminal of the user being called.

11. The device as claimed in claim 9, wherein the device is a server.

12. The device as claimed in claim 9, wherein the device is a terminal.

13. A non-transitory recording medium readable by a processor and on which is recorded a program comprising instructions for execution of a computer-implemented method for safeguarding anonymity of a user being called during a communication between a terminal of a caller and a correspondent device of a user being called, when the program is executed by the processor, wherein the correspondent device corresponds to a terminal of the user being called or a voicemail server associated with the user being called, and wherein the instructions comprise:

instructions that configure the processor to store in a database an association between a telephone number of the correspondent device and an alias of the correspondent device, which is different than the telephone number of the correspondent device;

instructions that configure the processor to detect that the communication is directed from the terminal of the caller to the alias of the correspondent device that is stored in the database;

instructions that configure the processor to, in response to detecting the communication being directed to the alias, routing the communication to the telephone number of the correspondent device associated with the alias;

instructions that configure the processor to receive an audio sequence from the correspondent device in response to the communication sent by the terminal of the caller;

instructions that configure the processor to put on hold the terminal of the caller before or after receiving the audio sequence, to prevent the terminal of the caller from receiving a welcome message from the voicemail server;

instructions that configure the processor to, analyze the audio sequence received from the correspondent device, in order to determine whether the audio sequence corresponds to a pick-up of the terminal of the user being called, or a pick-up of the voicemail server associated with the user being called, instructions that configure the processor to, in the case in which the processor determines that the audio sequence corresponds to the pick-up of the terminal of the user being called, taking the terminal of the caller off hold and establishing a communication link between the terminal of the caller and the terminal of the user being called; and instructions that configure the processor to, in the case in which the processor determines that the audio sequence corresponds to the pick-up of the voicemail server associated with the user being called, interrupt the communication link between the terminal of the caller and the correspondent device, and initiate transmission to the terminal of the caller of an anonymous welcome message in which the identity of the user being called is not revealed, the anonymous welcome message being stored in a non-transitory computer-readable medium, which is not part of the voicemail server.

* * * * *